(12) United States Patent
Typrowicz et al.

(10) Patent No.: US 11,169,936 B2
(45) Date of Patent: Nov. 9, 2021

(54) METHOD FOR CHECKING PROGRAM EXECUTION OF A MICROCONTROLLER, EXTERNAL DEVICE, SYSTEM AND NON-TRANSITORY COMPUTER READABLE MEDIUM

(71) Applicant: APTIV TECHNOLOGIES LIMITED, St. Michael (BB)

(72) Inventors: Wojciech Typrowicz, Beczyn (PL); Krzysztof Holon, Cracow (PL); Mateusz Romaszko, Cracow (PL); Grzegorz Wyszynski, Cracow (PL)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 16/985,632

(22) Filed: Aug. 5, 2020

(65) Prior Publication Data

US 2021/0049113 A1    Feb. 18, 2021

(30) Foreign Application Priority Data

Aug. 16, 2019 (EP) .................................... 19192071

(51) Int. Cl.
*G06F 13/12* (2006.01)
*G06F 13/42* (2006.01)

(52) U.S. Cl.
CPC .............. *G06F 13/12* (2013.01); *G06F 13/42* (2013.01); *G06F 2213/40* (2013.01)

(58) Field of Classification Search
CPC .......... G06F 13/12; G06F 13/42; G06F 13/40; G06F 1/0751; G06F 9/4411; G06F 11/30; G06F 12/0646; G06F 11/3003; G06F 11/3041

See application file for complete search history.

(56) References Cited

U.S. PATENT DOCUMENTS 6,266,781 B1 * 7/2001 Chung ................ G06F 11/2023 714/4.1
6,708,283 B1 * 3/2004 Nelvin ................ G06F 11/2005 710/316

(Continued)

OTHER PUBLICATIONS

Arreola, et al., RESTOP: Retaining External Peripheral State in Intermittently-Powered Sensor Systems; SENSORS, vol. 18, No. 2, Jan. 10, 2018, p. 172, XP055670358, DOI: 10.3390/s18010172; www.mdpi.com/journal/sensors.

(Continued)

*Primary Examiner* — Raymond N Phan
(74) *Attorney, Agent, or Firm* — Carlson, Gaskey & Olds

(57) ABSTRACT

A method for checking program execution of a microcontroller relating to a peripheral device in data communication with a microcontroller via a communication bus includes monitoring the microcontroller by an external device, identifying a failure status of the microcontroller by the external device based on the monitoring, disconnecting data communication between the peripheral device and the microcontroller by the external device, establishing a supplementary data communication between the external device and the peripheral device, and sending configuration information to the peripheral device by the external device via the supplementary data communication.

15 Claims, 2 Drawing Sheets

(56) References Cited

U.S. PATENT DOCUMENTS

Figure 1:
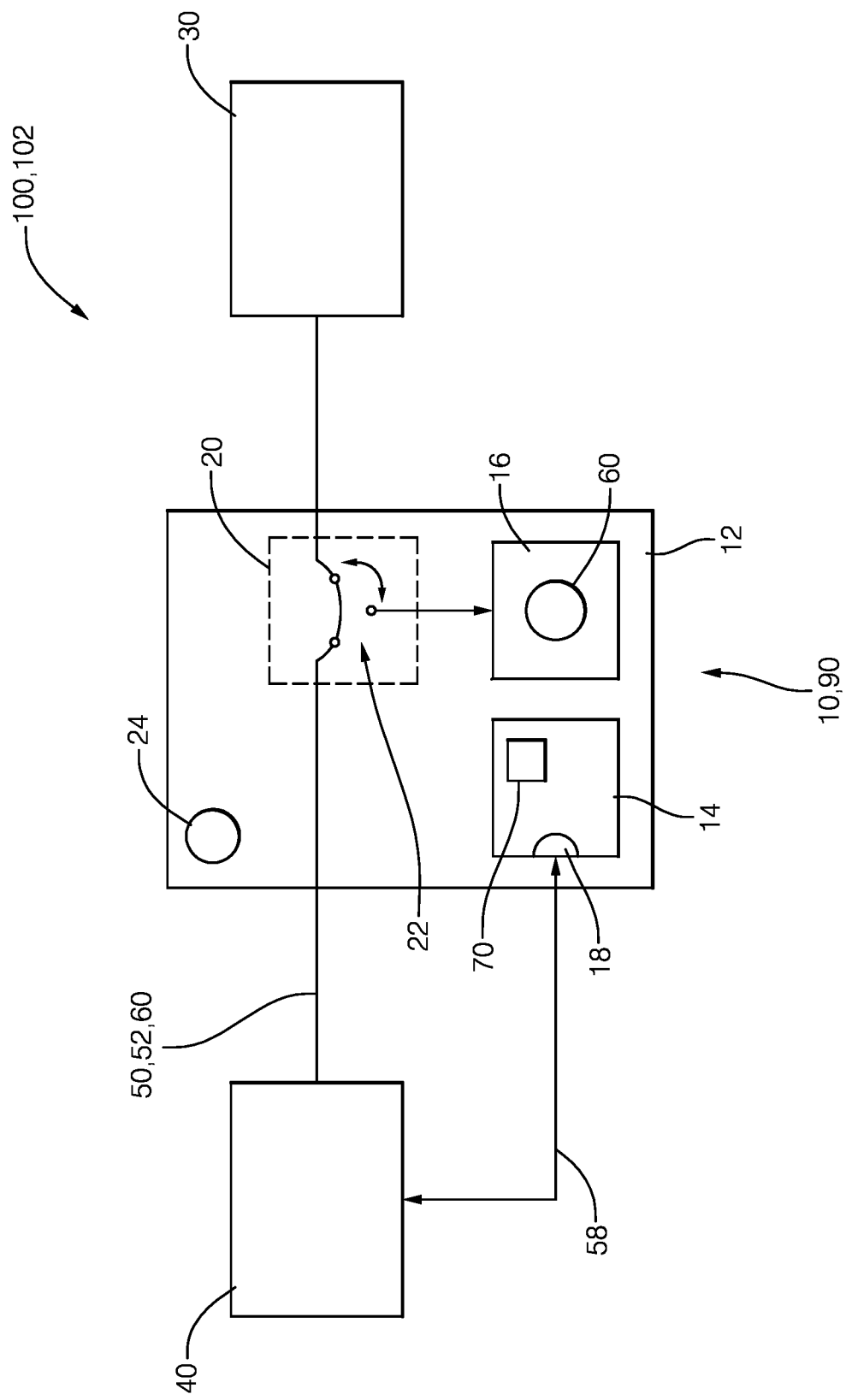

| | | | |
|---|---|---|---|
| 6,789,114 B1* | 9/2004 | Garg | H04L 41/147 |
| | | | 709/224 |
| 9,787,522 B1* | 10/2017 | Contreras | H04L 63/0485 |
| 10,445,197 B1* | 10/2019 | Harpreet | H04L 41/0654 |
| 2008/0015713 A1* | 1/2008 | Pannwitz | B60W 50/00 |
| | | | 700/8 |
| 2013/0024721 A1 | 1/2013 | Kabulepa et al. | |
| 2013/0254592 A1* | 9/2013 | Yamada | G06F 11/1497 |
| | | | 714/10 |
| 2014/0058541 A1 | 2/2014 | Goepfert et al. | |
| 2016/0056001 A1* | 2/2016 | Sawano | G06F 1/24 |
| | | | 307/125 |
| 2018/0005788 A1* | 1/2018 | Pullmann | G05B 9/03 |
| 2018/0267870 A1* | 9/2018 | Bhatia | G06F 11/2038 |
| 2019/0018727 A1* | 1/2019 | Huh | G06F 11/1446 |
| 2020/0019543 A1* | 1/2020 | Wang | G06F 9/3836 |

OTHER PUBLICATIONS

Extended European Search Report for EP Application No. 19 19 2071 dated Mar. 23, 2020.

* cited by examiner

METHOD FOR CHECKING PROGRAM EXECUTION OF A MICROCONTROLLER, EXTERNAL DEVICE, SYSTEM AND NON-TRANSITORY COMPUTER READABLE MEDIUM

CROSS-REFERENCE TO RELATED APPLICATION

This application claims priority to European Patent Application No. EP19192071.9 filed on Aug. 16, 2019

FIELD

The present disclosure relates to a method for checking program execution of a microcontroller relating to a peripheral device, wherein the peripheral device is in data communication with the microcontroller via a communication bus. Further, the present disclosure relates to an external device for checking program execution of a microcontroller relating to a peripheral device and a system comprising a microcontroller, a peripheral device and such an external device. In addition, the present disclosure relates to a non-transitory computer readable medium comprising instructions for carrying out the aforementioned method.

BACKGROUND

Systems with peripheral devices controlled by microcontrollers are commonly known in the state of the art. Such peripheral devices usually are in data communication with the microcontroller via a communication bus. Programs are executed for an operation of the peripheral device by the microcontroller and data, especially configuration information of the microcontroller addressed to the peripheral device, is transmitted via the communication bus.

In case of identified problems during the program execution of the microcontroller, the program execution is stopped and the data communication between the microcontroller and the peripheral device is interrupted. In this case, the peripheral device stays with the last transmitted configuration information. This often causes problems, as the last configuration information transferred from the microcontroller to the peripheral device can already be incorrect and/or corrupt.

Accordingly, there is a need to provide a possibility to provide correct and non-corrupt configuration information for the peripheral device, especially after entering the safe mode of the system.

SUMMARY

In one aspect, the present disclosure is directed at a method for checking program execution of a microcontroller relating to a peripheral device, wherein the peripheral device is in data communication with the microcontroller via a communication bus. The method according to the present disclosure comprises the following steps:
  a) monitoring the microcontroller by an external device,
  b) identifying a failure status of the microcontroller by the external device based on the monitoring of step a),
  c) disconnecting the data communication between the peripheral device and the microcontroller by the external device,
  d) establishing a supplementary data communication between the external device and the peripheral device, and
  e) sending configuration information to the peripheral device by the external device via the supplementary data communication.

The method according to the present disclosure is intended to be carried out in and/or by a system comprising a microcontroller and a peripheral device. In such a system, the peripheral device is in data communication to the microcontroller via a communication bus. A program execution of the system as a whole includes and often is even based on this data communication, whereby configuration information for the peripheral device is provided by the microcontroller, in most of the cases depending on the program execution of the microcontroller, and transferred to the peripheral device by the data communication via the communication bus. Hence a failure of the program execution of the microcontroller may lead to a failure of the system as a whole.

To prevent such a cascading effect, in a first step a) of the method according to the present disclosure, an external device monitors the microcontroller. Especially a device logic as part of the external device is used for this function. This monitoring can for instance be carried out using a special monitoring data communication between the external device and the microcontroller. Via the monitoring data communication, performance figures of the operation of the microcontroller can be received by the external device and subsequently compared to respective specifications. Additionally or alternatively, the external device can observe the data communication on the communication bus between the microcontroller and the peripheral device to detect aberrations from normal operation.

In the second step b) of the method according to the present disclosure, the aforementioned comparisons between the monitored information gained in step a) and respective specifications representing a normal, faultless operation, are carried out to identify a failure status of the microcontroller. As mentioned above, also this identification is carried out by the external device, especially by the device logic. In other words, after completion of step b) there is information present that a failure of the microcontroller is on hand.

As reaction on the failure of the microcontroller identified in step b), in the following step c) of the method according to the present disclosure the data communication between the peripheral device and the microcontroller is disconnected by the external device. Especially, the external device may comprise a bus interface, in particular controlled by the device logic, to execute this task. After disconnecting, a data communication between the microcontroller and the peripheral device is no longer possible. Hence incorrect and/or corrupt configuration information provided by the microcontroller due to its failure is no longer transferred to the peripheral device.

Additionally, in the following step d) of the method according to the present disclosure, a supplementary data communication between the external device and the peripheral device is established. Similar to step c) also establishing the supplementary data communication may be provided by a bus interface of the external device. As a result, after step d) a data communication between the external device and the peripheral device is possible.

The aforementioned supplementary data communication is used in the last step e) of the method according to the present disclosure to send correct and non-corrupt configuration information to the peripheral device by the external device. This configuration information may be held available in a backup memory of the external device. The configuration information is correct and non-corrupt. In other words, in this final step e) of the method according to the present disclosure it can be assured that the peripheral device can be provided with correct and non-corrupt configuration information. Any incorrect and/or corrupt configuration information already sent from the microcontroller to the peripheral device due to the failure of the microcontroller is replaced by correct and non-corrupt configuration information. The incorrect and/or corrupt configuration information is erased and/or overwritten with the correct and non-corrupt configuration information provided by the external device.

In summary, the method according to the present disclosure can prevent a presence of incorrect and/or corrupt configuration information in the peripheral device. Any incorrect and/or corrupt configuration information sent by the microcontroller due to its failure can be replaced by correct and non-corrupt configuration information sent by the external device. Hence a possible delay of the external device in answering to the failure of the microcontroller can be compensated. After a settlement of the failure of the microcontroller, the respective system can immediately resume its program execution due to the correct and non-corrupt configuration information present in the peripheral device. Especially a suitably configured watchdog device, in particular a watchdog device as described herein, can be used as external device with respect to an execution of the method according to the present disclosure.

According to an embodiment, the method comprises that after step e) the external device continues to monitor the microcontroller to detect an end of the failure status of the microcontroller. In other words, the external device not only detects an appearance of a failure of the microcontroller, but also its disappearance. The time of an interruption of program execution of the microcontroller and hence the respective system can therefore be reduced, in particular be minimized.

According to a further improved embodiment, the method comprises that after detecting an end of the failure status of the microcontroller, the external device reestablishes the data communication between the peripheral device and the microcontroller. After a disappearance of the failure of the microcontroller, recognized by the external device by detecting an end of the respective failure, the external device itself reestablishes the data communication between the microcontroller and the peripheral device, allowing the program execution of the system as a whole to start again. Hence no external device is necessary to provide this start-over ability.

According to an embodiment, the method according to the present disclosure comprises that after step c) the external device sends a reset and/or restart signal to the microcontroller. After step c) the data communication between the microcontroller and the peripheral device via the communication bus is interrupted and no longer possible. In other words, the microcontroller can be addressed without any implications on the peripheral device. Hence a restart of the microcontroller can be carried out safely. By sending a reset and/or restart signal to the microcontroller by the external device, for instance via the aforementioned monitoring data communication, this restarting process of the microcontroller can be initiated by the external device itself. Hence no external device is necessary to provide this restart initiating functionality.

In particular, the method according to the present disclosure can be characterized in that steps c) and d) are essentially carried out simultaneously, in particular wherein the data communication established in step d) at least partly uses the communication bus by communication bus switching. First of all, a simultaneous execution of the steps c) and d) provides the advantage of time saving during execution of the method according to the present disclosure. Additionally, communication bus switching can be used, whereby the data communication established in step d) at least partly uses the communication bus already existing in the respective system. The peripheral device is connected to the communication bus allowing a data communication between the microcontroller and the peripheral device during normal operation. Communication bus switching simply changes the recipient on the other end of the communication bus and replaces the microcontroller as recipient with the external device. In other words, the supplementary data communication at least partly uses the existing communication bus, especially the part of the communication bus directly connected to the peripheral device. Hence additional communication connections between the external device and the peripheral device can be avoided.

Further, according to an embodiment, the method according to the present disclosure comprises that the external device passes on information about a failure of the microcontroller and/or about carrying out one or more of the steps b) to e) to a superordinate control system. In other words, the superordinate control system gets to know that the microcontroller is in a failure status and/or that a program execution of the microcontroller and hence of the respective system has stopped. Additionally, also an end of the failure status of the microcontroller and/or a restart of the program execution may be broadcasted to the superordinate control system. This allows the superordinate control system to initiate further measures, for instance a shutdown and/or change of action of downstream equipment dependent on the respective system comprising the erroneous microcontroller. Operational safety and reliability of higher level equipment controlled by the superordinate control system can therefore be improved.

In another aspect, the present disclosure is directed at an external device, in particular a watchdog device, for checking program execution of a microcontroller relating to a peripheral device, comprising a device logic, a backup memory for storing configuration information for a peripheral device, a microcontroller interface for establishing a data communication between the external device and the microcontroller, and a bus interface to disconnect a data communication between the microcontroller) and the peripheral device and to establish a supplementary data communication between the external device and the peripheral device, wherein the device logic is being configured to carry out the method described herein.

The external device according to the present disclosure comprises at least a device logic, a backup memory, a microcontroller interface and a bus interface. The device logic can comprise for instance a microprocessor and can be able to run instructions provided by a computer readable medium. In the backup memory, correct and non-corrupt configuration information for a peripheral device can be stored for a recall by the device logic. The microcontroller interface allows an in particular bidirectional data communication between the external device and an external microcontroller, the bus interface allows to disconnect a data communication between the microcontroller and the peripheral device and additionally to establish an in particular bidirectional supplementary data communication between the external device and the peripheral device. In summary, the external device, especially its device logic, is configured to carry out the method described herein. Hence the external device according to the present disclosure comprises the same advantages described above with respect to the method according to the present disclosure. In particular, the external device according to the present disclosure can be designed as a watchdog device.

According to an embodiment, the external device according to the present disclosure comprises a device bulk, the device bulk at least comprising the device logic, whereby the bus interface is arranged separately to the device bulk. In other words, the bus interface for disconnecting the data communication between the microcontroller and the peripheral device and establishing the supplementary data communication between the external device and the peripheral device, can be located at a different position with respect to the device bulk, wherein the device bulk at least contains the device logic, in particular also other elements like the backup memory. This embodiment of an external device according to the present disclosure provides the advantage that the device bulk can be arranged in arbitrary distance to the communication bus. Constraints with respect to available space for an arrangement of the device bulk can therefore be avoided and/or met more easily.

According to an alternative embodiment, the external device according to the present disclosure comprises a device bulk, the device bulk at least comprising the device logic, whereby the device bulk also comprises the bus interface. In other words, the bus interface for disconnecting the data communication between the microcontroller and the peripheral device and establishing the supplementary data communication between the external device and the peripheral device is integrated into the device bulk, wherein further the device bulk at least contains the device logic, in particular also other elements like the backup memory. In this embodiment the external device as a whole can be constructed especially compact and with low need for available space.

According to a further embodiment, the external device according to the present disclosure comprises that the backup memory is a non-volatile memory. In such a non-volatile memory, the content, especially the correct and non-corrupt configuration information, is securely saved for instance even if a power failure occurs. By providing a non-volatile memory as backup memory, a reliability of the external device according to the present disclosure can be improved.

According to an embodiment, the external device according to the present disclosure comprises a device bulk, the device bulk at least comprising the device logic, whereby the backup memory is arranged separately to the device bulk. In other words, the backup memory in which the correct and non-corrupt configuration information for the peripheral device is stored can be located at a different position as the device bulk, wherein the device bulk at least contains the device logic. This embodiment provides the advantage that the backup memory can be arranged at a different location as the device bulk. A change of the backup memory and/or special security measures to protect the backup memory can therefore be provided more easily.

According to an alternative embodiment, the external device according to the present disclosure comprises a device bulk, the device bulk at least comprising the device logic, whereby the device bulk also comprises backup memory. In other words, the backup memory in which the correct and non-corrupt configuration information for the peripheral device is stored is integrated into the device bulk, wherein further the device bulk at least contains the device logic. In this embodiment the external device as a whole can be constructed especially compact and with low need for available space.

According to a further embodiment, the external device according to the present disclosure comprises a connection element providing an alerting data communication between the external device and a superordinate control system for passing on information about a failure of the microcontroller and/or about carrying out one or more of the steps b) to e) to the superordinate control system. In other words, the external device according to the present disclosure can use the connection element to establish an alerting data communication to a superordinate control system to inform the superordinate control system that the microcontroller is in a failure status and/or that a program execution of the microcontroller and hence of the respective system has stopped. Additionally, also an end of the failure status of the microcontroller and/or a restart of the program execution of the microcontroller and/or or of the respective system as a whole can be broadcasted to the superordinate control system. This allows the superordinate control system to initiate further measures, for instance a shutdown and/or change of action of downstream equipment dependent on the respective system comprising the erroneous microcontroller. Operational safety and reliability of higher level equipment controlled by the superordinate control system can therefore be improved.

In another aspect, the present disclosure is directed at a system comprising a microcontroller, a peripheral device in data communication with the microcontroller via a communication bus and an external device at least connected to the microcontroller and the communication bus, wherein the external device is configured as described herein. An external device described herein is configured to carry out the method described herein. Hence the system comprises the same advantages described above with respect to the method according to the present disclosure and with respect to the external device according to the present disclosure, respectively.

In another aspect, the present disclosure is directed at a non-transitory computer readable medium comprising instructions for carrying out the method herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage. As the computer readable medium according to the present disclosure comprises instructions for carrying out the method according to the present disclosure, the non-transitory computer readable medium comprises the same advantages described above with respect to the respective method.

DRAWINGS

Figure 2:
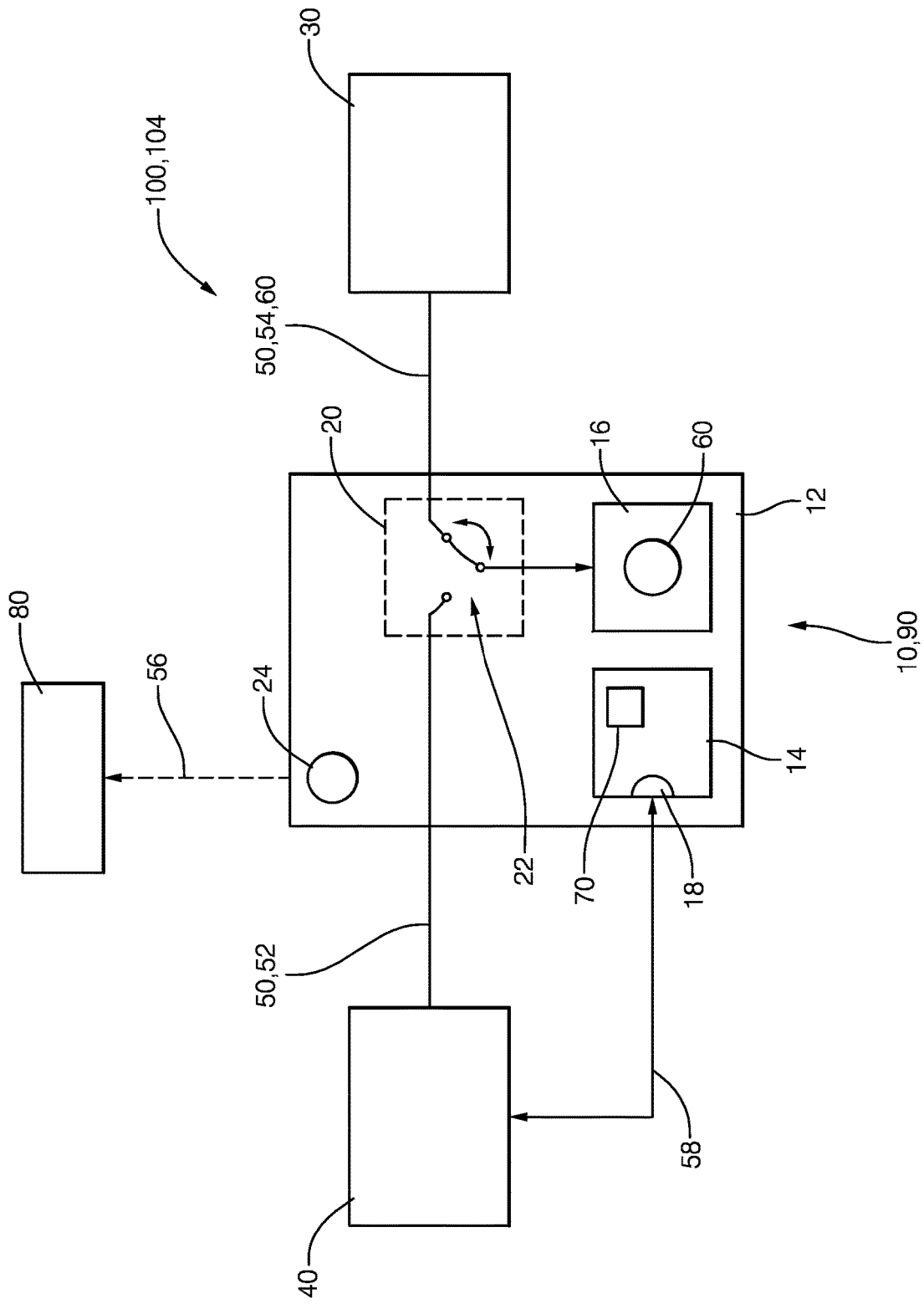

Exemplary embodiments and functions of the present disclosure are described herein in conjunction with the following drawings, showing schematically:

FIG. 1 illustrates a system according to the present disclosure in its normal mode, and FIG. 2 illustrates a system according to the present disclosure in its safe mode

DETAILED DESCRIPTION

FIGS. 1 and 2, respectively, depict a system 100 according to the present disclosure. In FIG. 1 the system 100 is shown in its normal mode 102, in FIG. 2 in its safe 104. In the following, FIGS. 1 and 2 are described together, wherein each figure is addressed separately if necessary.

The system 100 comprises a microcontroller 40 and a peripheral device 30 in data communication 52 with each other via a communication bus 50. With the system 100 in its normal mode 102, data is exchanged between the microcontroller 40 and the peripheral device during program execution of the microcontroller 40 and hence of the system 100, especially commands and configuration information 60, see FIG. 1. An external device 10 as part of the system 100 monitors the function of the microcontroller 40, in the depicted embodiment of the system 100 according to the present disclosure via a monitoring data communication 58 provided by a microcontroller interface 18. The external device 10 of the depicted embodiment of the system 100 according to the present disclosure is designed as a watchdog device 90.

The external device 10 further comprises a device bulk 12, in which at least some of the elements of the external device 10 are arranged and combined. Especially, the device bulk 12 may be arranged within a single housing. In the embodiment of the external device 10 depicted in FIGS. 1 and 2, the device bulk 12 comprises a device logic 14, a backup memory 16, a microcontroller interface 18 as part of the device logic 14, a bus interface 20 comprising a bus switch 22, and a connection element 24 for a connection to a superordinate control system 80 (see FIG. 2). In particular, the backup memory 16 may be a non-volatile memory and contains correct and non-corrupt configuration information 60 for the peripheral device 30. The device logic 14 can contain a computer readable medium 70 comprising instructions for carrying out the method according to the present disclosure as described in the following with respect to FIG. 2.

Alternatively and not shown in FIGS. 1 and 2, both the bus interface 20 and/or the backup memory 16 can be arranged separately to the device bulk 12.

FIG. 2 shows the system 100 according to the present disclosure in its safe mode 104. This safe mode 104 is established by the external device 10, in particular by the watchdog device 90, as result of carrying out the method according to the present disclosure.

In a first step a) of the method according to the present disclosure, the external device 10, especially the device logic 14, monitors the microcontroller 40. This can for instance be provided via the monitoring data communication 58 and/or by monitoring the data exchanged between the microcontroller 40 and the peripheral device 30 via the communication bus 50.

If during this monitoring a failure status of the microcontroller 40 is identified by the external device 10 in the next step b) of the method according to the present disclosure, the subsequent step c) includes a disconnection of the data communication 52 between the microcontroller 40 and the peripheral device 30 carried out by the external device 10. For this, the external device 10 comprises a bus switch 22 as part of a bus interface 20.

The bus switch 22 provides the advantage that simultaneously to the disconnection of the data communication 52 between the microcontroller 40 and the peripheral device 30 according to step c), a supplementary data communication 54 can be established between the external device 10 and the peripheral device 30, as disclosed in step d) of the method according to the present disclosure. Especially, the part of the communication bus 50 already connected to the peripheral device 30 can also be used for the supplementary data communication 54.

In the last step e) of the method according to the present disclosure, the correct and non-corrupt configuration information 60 stored in the backup memory 16 of the external device 10 is sent and transferred to the peripheral device 30 via the supplementary data communication 54. Incorrect and/or corrupt configuration information 60 already present in the peripheral device 30, which may be sent from the already malfunctioning microcontroller 40 to the peripheral device 30 before the disconnection of the data communication 52 in step c), can therefore be erased and replaced by this correct and non-corrupt configuration information 60. A restart of the system 100 and switching back the system 100 to normal mode 100 can therefore easily be initiated after an end of the failure status of the microcontroller 40.

To provide this restart of the system 100 in an especially fast and time saving way, the external device 10 may be enabled to continue the monitoring of the microcontroller 40 and to reestablish the data communication 52 between the microcontroller 40 and the peripheral device 30 after detecting an end of the failure status of the microcontroller 40. Further, the external device 10 itself may sent a reset and/or restart signal to the microcontroller 40, in particular after disconnecting the data communication 52 between the microcontroller 40 and the peripheral device 30 in step c) of the method according to the present disclosure.

Additionally and as depicted in FIGS. 1 and 2, the external device 10 may comprise a connection element 24 to establish an alerting data communication 56 to a subordinate control system 80. The information about the status of the system 100, especially whether the system 100 is in its normal mode 102 or in its safe mode 104, can be provided to the subordinate control system 80. In other words, the external device 10 can inform the superordinate control system 80 that the microcontroller 10 is in a failure status and/or that a program execution of the microcontroller 40 and hence of the respective system 100 has stopped. Additionally, also an end of the failure status of the microcontroller 10 and/or a restart of the program execution can be broadcasted to the superordinate control system 80. Operational safety and reliability of higher level equipment controlled by the superordinate control system 80 can therefore be improved.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method for checking program execution of a microcontroller relating to a peripheral device, wherein the peripheral device is in data communication with the microcontroller via a communication bus, the method comprising:
monitoring the microcontroller by an external device,
identifying a failure status of the microcontroller by the external device based on the monitoring, disconnecting data communication between the peripheral device and the microcontroller by the external device, establishing a supplementary data communication between the external device and the peripheral device, and sending configuration information to the peripheral device by the external device via the supplementary data communication.

2. The method according claim 1, wherein after sending the configuration information, the external device continues to monitor the microcontroller to detect an end of the failure status of the microcontroller.

3. The method according to claim 1, wherein after the disconnecting the external device sends a reset and/or restart signal to the microcontroller.

4. The method according to claim 1, wherein disconnecting the data communication and establishing the supplementary data communication are essentially carried out simultaneously and the established supplementary data communication at least partly uses the communication bus by communication bus switching.

5. The method according to claim 1, wherein the external device passes on information to a superordinate control system about at least one of
   (i) a failure of the microcontroller and
   (ii) carrying out one or more of the identifying, disconnecting, establishing and sending.

6. An external device for checking program execution of a microcontroller relating to a peripheral device, the external device comprising:
   a device logic configured to perform the method of claim 1,
   a backup memory for storing configuration information for the peripheral device,
   a microcontroller interface for establishing a data communication between the external device and the microcontroller, and
   a bus interface to disconnect a data communication between the microcontroller and the peripheral device and to establish a supplementary data communication between the external device and the peripheral device.

7. A non-transitory computer readable medium comprising instructions that are executable by at least one computing device to perform the method of claim 1.

8. The method according claim 2, wherein after detecting an end of the failure status of the microcontroller, the external device reestablishes the data communication between the peripheral device and the microcontroller.

9. The external device according to claim 6, wherein the external device comprises a device bulk, the device bulk at least comprising the device logic, whereby the bus interface is arranged separately from the device bulk.

10. The external device according to claim 6, wherein the external device comprises a device bulk, the device bulk at least comprising the device logic, whereby the device bulk also comprises the bus interface.

11. The external device according to claim 6, wherein the backup memory is a non-volatile memory.

12. The external device according to claim 6, wherein the external device comprises a device bulk, the device bulk at least comprising the device logic, whereby the backup memory is arranged separately from the device bulk.

13. The external device according to claim 6, wherein the external device comprises a device bulk, the device bulk at least comprising the device logic, whereby the device bulk also comprises the backup memory.

14. The external device according to claim 6, wherein the external device comprises a connection element providing an alerting data communication between the external device and a superordinate control system for passing on information about at least one of
   (i) a failure of the microcontroller and
   (ii) carrying out one or more of the identifying, disconnecting, establishing and sending.

15. A system comprising:
   the external device of claim 6,
   a microcontroller,
   a peripheral device in data communication with the microcontroller via a communication bus,
   wherein the external device is at least connected to the microcontroller and the communication bus.

* * * * *